Feb. 23, 1960   J. W. LOVELY   2,925,659
RING GAGE
Filed Feb. 13, 1957

INVENTOR
John W. Lovely

BY Sughrue, Rothwell, Mion and Zinn
ATTORNEYS

United States Patent Office
2,925,659
Patented Feb. 23, 1960

2,925,659

RING GAGE

John W. Lovely, Springfield, Vt., assignor to Bryant Chucking Grinder Company, Springfield, Vt., a corporation of Vermont Application February 13, 1957, Serial No. 639,902

6 Claims. (Cl. 33—168)

This invention relates to an improved ring gage.

A ring gage is a measuring instrument that generally consists of an accurately dimensioned annulus or ring. In present manufacturing and machine shop practice ring gages are commonly used in pairs to control dimensions, one of the pair being used to physically represent the minimum tolerance limit, and the other the maximum. A particularly important field of use of ring gages is as masters for setting, checking, and rechecking the indicator means in an air gaging system. These systems, well known in the art, utilize a sensing element in the form of a gage plug having radial escape orifices or nozzles for a fluid medium such as air which is supplied at a constant pressure to the interior of the plug. The outside diameter of the plug is less than the diameter of the hole to be measured, and the difference between the plug and hole diameters is the variable factor of the fluid escape area, reflected as a pressure or flow variation proportional to measured diameter. The air gage indicator means must be calibrated by the use of accurate master ring gages, and it is common practice to utilize two ring gage masters to obtain the correct indication of the maximum and minimum limit control dimensions. This involves high initial cost, costly maintenance, and elaborate and time consuming handling in use. With a dual diameter master gage ring of the present invention substituted for the two conventional masters the initial cost is brought down and the time consumed for setting, checking and rechecking the air gage system is only a fraction of that which was needed previously.

It is therefore an object of this invention to provide a single ring gage of the limit type that physically represents both the minimum and maximum limit control dimensions, thereby eliminating the need for two precision ring gages for checking maximum and minimum dimensions.

Another object is to provide a gage ring having two control dimensions which are located in the same plane, but displaced approximately 90° from each other.

Other objects and advantages will be apparent from the following description taken in connection with the accompanying drawings, wherein.

Figure 1:
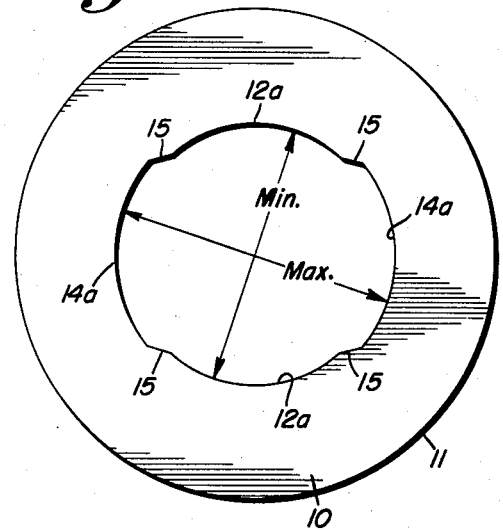
Figure 1 is a plan view of a ring gage illustrating the configuration of the dual diameter hole in a ring of the present invention.

Referring to Figure 1, the body of the gage consists of an annular gage ring body member 10 having an outside circular periphery 11, and a hole or cavity of a configuration distinctive of the present invention. Instead of having a single diameter hole as a conventional gage ring, the hole or cavity 10 has a minimum diameter 12 and a maximum diameter 14. The difference between diameters 12 and 14 is shown grossly exaggerated for the sake of clarity. Diameters 12 and 14 each consist of two pairs of arcuate sections 12a and 14a on the inner periphery of the ring. The matching sections of the same arcuate radius positioned in opposite quadrants, and each section is connected to the adjoining section at a smooth transition zone or step 15.

Figure 2:
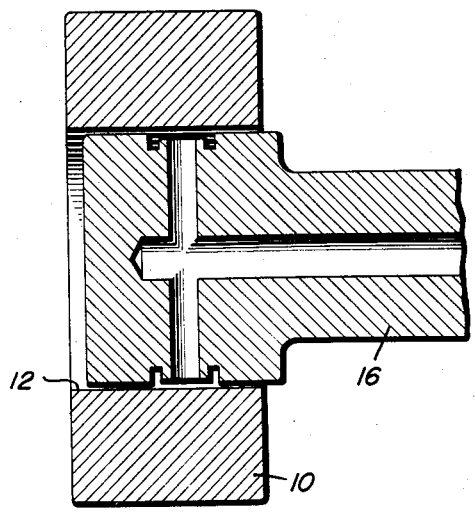
Figure 2 is a sectional view taken on line 2—2 through the minimum hole diameter of Figure 1.

In Figure 2, a conventional air gage plug 16 is introduced with its lateral nozzles directed to measure the minimum diameter 12. The air gage plug is a device well known in the art and forms no part of the invention. It will be apparent that when the plug 16 is introduced into the gage ring as in Figure 2, it may be rotated 90° with respect to the gage, thus permitting an operator to fast and repeatedly check the plug for both the minimum and maximum tolerance limits.

The embodiments shown and described are only illustrative. Various other embodiments will be apparent to one skilled in the art and may be utilized without departing from the scope of the appended claims.

I claim:

1. A ring gage master for checking the calibration of an air gage system, comprising: a body member provided with a cavity therein, said cavity shaped such that all cross sections through the body member and normal to the axis of the member are identical and are congruently bounded by a line forming a closed plane figure, said line including a pair of diametrically opposite arcs of a first cycle, and a pair of diametrically opposite arcs of a second circle of a diameter different from the diameter of the first circle, the arcs of the first circle angularly spaced substantially 90° from the arcs of the second circle; the portion of said line adjoining said arcs being a substantially straight line to provide a relatively smooth transition zone from one arc to another without increasing the diameter at any point to more than the diameter of the largest pair of arcs or decreasing the diameter at any point to less than the diameter of the smallest diameter pair of arcs; the arcs of the first circle providing a measuring zone and by their diameter are defining a first calibration value, and the arcs of the second circle also providing a measuring zone, and by their diameter are defining a second calibration value.

2. A ring gage comprising: a member having an interior cavity, said cavity shaped such that cross sections taken through the member normal to the axis of the member are identical and are congruently bounded by a closed curve including a first and a second pair of diametrically opposed arcs of different diameter circles, said arcs of different diameter being located alternately in juxtaposition on the closed curve, the portion of said curve adjoining said arcs being a substantially straight line to provide a relatively smooth transition zone from one arc to another without increasing the diameter at any point to more than the diameter of the largest pair of arcs or decreasing the diameter at any point to less than the diameter of the smallest diameter pair of arcs; the first pair of arcs defining by their diameter a predetermined value of an effective measure, and the second pair of arcs defining by their diameter another predetermined value of an effective measure.

3. A ring gage master for calibrating the indicating means of an air gage system by introducing the sensing element of the system to the master, said master comprising: a body member provided with a cavity where all planes normal to the axis of the member contain similar plane figures bounded by identical closed curves, each curve including a first and a second pair of opposite arcs of different diameter circles, said arcs arranged alternately in juxtaposition on the curve such that at least part of one arc of each pair is diametrically opposite at least part of the other arc of the same pair, the portion of said curve adjoining said arcs being a substantially straight line to provide a relatively smooth transition zone from one arc to another without increasing the diameter at any point to more than the diameter of the largest pair of arcs or decreasing the diameter at any point to less than the diameter of the smallest diameter pair of arcs; the diameter of the first pair of arcs establishing a predetermined value of the escape area for the air from the sensing element whilst introduced with its lateral nozzles directed toward these first arcs, and in the same plane normal to the axis of the member, the diameter of the second pair of arcs in the same manner establishing another predetermined value.

4. A ring gage master for calibrating the indicating means of an air gage system by presenting the sensing element of the system to the master, said master comprising: a body member provided with a cavity where all cross sections normal to the axis of the member are congruently bounded by a line forming a closed plane figure, this line including two pairs 90° angularly spaced opposite arcuate sectors, the portion of said line adjoining said arcuate sectors being a substantially straight line to provide a relatively smooth transition zone from one arcuate sector to another without increasing the diameter at any point to more than the diameter of the largest pair of arcuate sectors or decreasing the diameter at any point to less than the diameter of the smallest diameter pair of arcuate sectors; the inside surface of the cavity, which will be equal to the diameter of the arcuate sectors defining a boundary of the escape area for the air whilst the sensing element is positioned in the ring gage cavity.

5. A ring gage master as defined in claim 4 where one pair of said arcuate sectors provides the means to establish a predetermined value of said escape area, and the other pair of arc portions provides the means to establish a different predetermined value of the escape area.

6. A ring gage master for checking the calibration of an air gage system comprising: a body member with a cavity where all cross sections normal to the axis of the member are congruently bounded by a line forming a closed plane figure, this line including at least two pairs of opposite arcs of different diameter circles with conjugate diameters defining two effective and different measures in a single plane, the portion of said line adjoining said arcs being a substantially straight line to provide a relatively smooth transition zone from one arc to another without increasing the diameter at any point to more than the diameter of the largest pair of arcs or decreasing the diameter at any point to less than the diameter of the smallest diameter pair of arcs.

References Cited in the file of this patent

UNITED STATES PATENTS

| | | |
|---|---|---|
| 1,017,879 | Landis | Feb. 20, 1912 |
| 1,438,681 | Bath | Dec. 12, 1922 |
| 1,539,742 | Joseph | May 26, 1925 |
| 1,894,382 | Mawer | Jan. 17, 1933 |
| 2,108,029 | Connor | Feb. 8, 1938 |
| 2,139,282 | Poock et al. | Dec. 6, 1938 |
| 2,592,409 | Frankland | Apr. 8, 1952 |

FOREIGN PATENTS

| | | |
|---|---|---|
| 170,306 | Germany | May 4, 1906 |
| 312,428 | Germany | May 27, 1919 |
| 716,337 | France | Oct. 6, 1931 |
| 904,509 | France | Nov. 8, 1945 |